(No Model.)
H. B. REX.
SAW.
No. 268,433.  Patented Dec. 5, 1882.
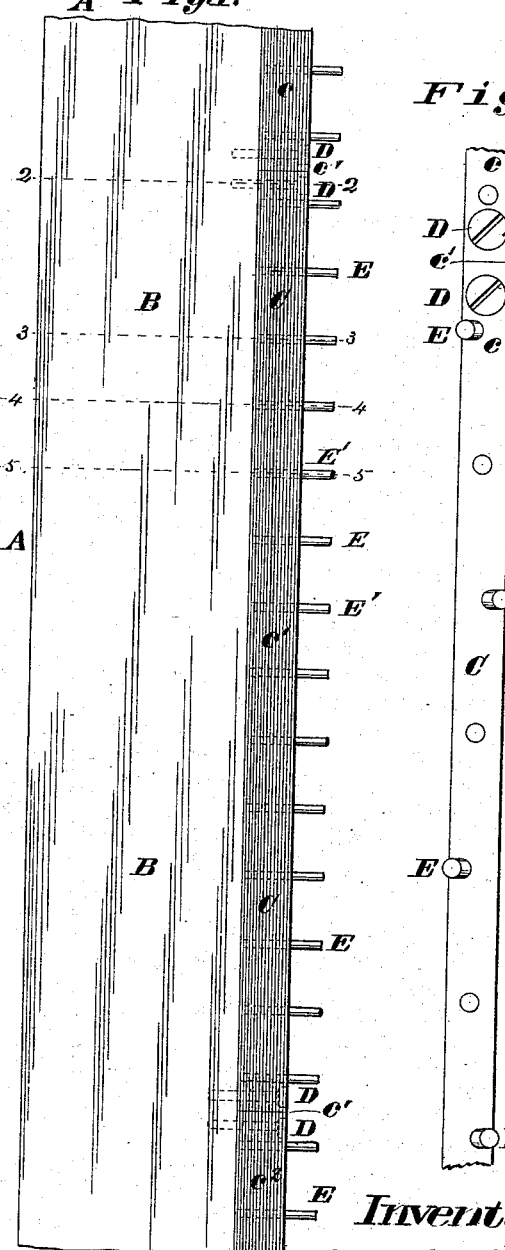
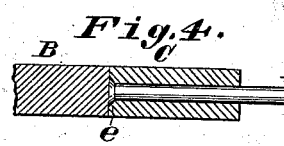
Attest:
Geo. H. Knight.
J. M. Hopkins.
Inventor:
Hugh B. Rex
By Knight Bros.
Attys.

UNITED STATES PATENT OFFICE.

HUGH B. REX, OF ST. LOUIS, MISSOURI, ASSIGNOR TO BENJAMIN F. REX, OF SAME PLACE.

SAW.

SPECIFICATION forming part of Letters Patent No. 268,433, dated December 5, 1882.

Application filed February 10, 1882. (No model.)

*To all whom it may concern:*

Be it known that I, HUGH B. REX, of the city of St. Louis and State of Missouri, have invented a certain Improvement in Saws, of which the following is a specification, reference being had to the accompanying drawings, forming part of the same.

This is an improvement in the class of saws intended especially for the sawing of soft porous rock having a sharp grit, and where there is consequently considerable wear of the teeth.

My improvement consists in making the edge of the saw of distinct removable piece or pieces, attached to the body of the saw in any suitable manner, and bored through for the insertion of hard-metal teeth, substantially as shown and described.

In the drawings, Figure 1 is a detail side elevation of a saw. Figs. 2, 3, 4, and 5 are enlarged detail sections at 2 2, 3 3, 4 4, and 5 5, respectively. Fig. 6 is an enlarged detail front view.

The saw A consists of a body, B, and a removable edge, C, preferably made in sections c c, so that any portion of the edge can be removed at a time. The edge is shown connected to the body of the saw by screws D. I wish it to be understood that I do not confine myself to any particular manner of connecting the edge strip or strips C to the body, but show the screws D as a proper means, and one that I have adopted. The edge strip C is made with holes extending completely through it from its back or inside to its front edge. Into these holes the teeth E E' are inserted, said teeth consisting of pins of hardened steel, having a head, $e$, at the inner end to prevent them from dropping out of the saw or protruding beyond the proper place. The teeth may consist of pins of round steel wire, (hardened,) and the heads may be made by a blow of a hammer. Some of the teeth, E, are shown extending straight forward in the plane of the saw, while others of them, E', are inclined to the right and the left to cut a kerf of sufficient width for the saw to work freely. The teeth extend at right angles to the front edge of the saw, so that the upstroke is equally effective with the downstroke in a vertical saw. The inner ends of the tooth-holes should be countersunk to receive the heads $e$ of the teeth.

In sawing some descriptions of stone or rock a number of teeth are liable to be injured by contact with a hard nodule. The making of the edge strip in a number of sections $c$ enables the teeth that may be injured to be removed without necessity for the removal of the whole strip. The abutting ends of the sections $c$ are shown at $c'$.

I claim as my invention—

1. A saw having removable edge strip provided with teeth extending through the said strip and abutting against the body of the saw.

2. A saw having removable edge strip with oblique teeth extending through the said strip and abutting against the body of the saw, for the purpose set forth.

HUGH B. REX.

Witnesses:
SAML. KNIGHT,
GEO. H. KNIGHT.